United States Patent [19]

Toeppen

[11] Patent Number: 5,335,236
[45] Date of Patent: Aug. 2, 1994

[54] LONG PULSE PRODUCTION FROM SHORT PULSES

[75] Inventor: John S. Toeppen, Livermore, Calif.

[73] Assignee: The United States of America as represented by the United States Department of Energy, Washington, D.C.

[21] Appl. No.: 70,519

[22] Filed: Jun. 3, 1993

[51] Int. Cl.⁵ .............................. H01S 3/13
[52] U.S. Cl. ................................ 372/25; 359/341; 359/345; 359/347; 385/27
[58] Field of Search ............ 372/9, 25, 29-31, 372/43, 44; 385/15, 27, 30, 39; 359/333, 334, 341, 345, 347

[56] References Cited

U.S. PATENT DOCUMENTS

| | | | |
|---|---|---|---|
| 4,881,790 | 11/1989 | Mollenauer | 385/15 X |
| 4,939,474 | 7/1990 | Eisenstein et al. | 372/43 X |
| 5,096,277 | 3/1992 | Kleinerman | 385/27 X |
| 5,191,628 | 3/1993 | Byron | 385/27 |

OTHER PUBLICATIONS

York brochure for "York DF 1500 amplifier fiber", Feb., 1991, Hampshire, England.
C. R. Giles and Emmanuel Desurvire, "Propagation of Signal and Noise in Concatenated Erbium-Doped Fiber Optical Amplifiers," Journal of Lightwave Technology, vol. 9, No. 2, pp. 147-154, Feb. 1991.

Primary Examiner—John D. Lee
Attorney, Agent, or Firm—Miguel A. Valdes; Roger S. Gaither; William R. Moser

[57] ABSTRACT

A method of producing a long output pulse (SA) from a short pump pulse (P), using an elongated amplified fiber (11) having a doped core (12) that provides an amplifying medium for light of one color when driven into an excited state by light of a shorter wavelength and a surrounding cladding 13. A seed beam (S) of the longer wavelength is injected into the core (12) at one end of the fiber (11) and a pump pulse (P) of the shorter wavelength is injected into the cladding (13) at the other end of the fiber (11). The counter-propagating seed beam (S) and pump pulse (P) will produce an amplified output pulse (SA) having a time duration equal to twice the transit time of the pump pulse (P) through the fiber (11) plus the length of the pump pulse (P).

5 Claims, 1 Drawing Sheet

LONG PULSE PRODUCTION FROM SHORT PULSES

STATEMENT OF GOVERNMENTAL RIGHTS

The Government has rights in this invention pursuant to Contract No. W-7405-ENG-48 between the U.S. Department of Energy and the University of California.

BACKGROUND OF THE INVENTION

This invention relates to the production of long pulses in response to short laser pulses and in particular to the use of a fiber amplifier in a manner such that a long amplified output pulse is produced in response to a short laser pump pulse.

Pulsed output lasers, such as copper vapor lasers, can be made to have a high average power output but with very short output pulses in the order of 5–50 nanoseconds in duration. The length of the pulses is an inherent characteristic of such lasers in that a continuous population inversion necessary for lasing cannot be obtained and time is required after a lasing pulse occurs for the higher energy level to be repopulated for the next lasing pulse.

There are a variety of applications wherein it is desirable to use such lasers to produce a beam with high average power output but with "stretched" output pulses of longer length. However, such stretched pulses are often difficult to produce. For example, beam splitter arrangements have been developed using a variety of beam splitters to divide input laser pulses and direct the divided pulses to different paths having mirrors arranged to provide different length optical delay paths for the pulses to traverse. The differently delayed pulses are then recombined into a single output pulse of a longer duration. The disadvantage of such a system is that it requires a very careful and precise alignment of the various beam splitters, mirrors and recombiners to produce a useful output.

Heretofore unrelated to the area of pulse stretching are fiber amplifiers. Laser amplification in a fiber medium is becoming a common practice, especially in communications wherein modulated light signal beams passing through a fiber optic system are periodically amplified to compensate for the attenuation of the beam as it travels through the system. Such amplifiers use an optical amplifier fiber with a suitably doped inner core of material which will provide an amplifying medium for light of the color of the signal beam when the core is driven into an excited state by light of a shorter wavelength. Typically, the amplifiers include a laser with a continuous output at the shorter wavelength positioned adjacent the doped core to excite a fixed region of the core and amplify the signal beam passing through that region.

SUMMARY OF THE INVENTION

It is the principal object of the invention to use a fiber amplifier in the production of a stretched output pulse from a short pump pulse, and thereby provide a method that is relatively simple and inexpensive, as compared to beam splitting methods, and yet is capable of producing beams of single mode quality or high multi-mode power.

Additional objects, advantages and novel features will be set forth in the description which follows, and in part will become apparent to those skilled in the art upon examination of the following, or may be learned by practice of the invention. The object and advantages of the invention may be realized and attained by means of instrumentalities and combinations pointed out in the appended claims.

To achieve the foregoing and other objects, and in accordance with the invention as described and broadly claimed herein, an elongated amplifier fiber is used for the production of a long amplified output pulse from a short pump pulse, the fiber having an inner core of a material that provides an amplifying medium for light of one wavelength when driven into an excited state by light of a shorter wavelength and a transparent cladding surrounding the inner core, with a seed beam of said one wavelength being injected into the core at one end of the optical fiber, said seed beam having a time duration at least as long as the desired lengths of the amplified output pulse, and with a short pump pulse of said shorter wavelength being injected into the cladding at the other end of the optical fiber for excitation of the core as the pump pulse travels through the length of said optical fiber.

A further aspect of the invention is that pump pulses may be repeatedly injected into the cladding with the time between the end of one pump pulse and the beginning of the next pump pulse being shorter than or approximately equal to twice the transit time of a pump pulse through the length of the optical fiber, such repeated pump pulses thereby creating a continuous amplification of the seed beam passing through the optical fiber.

BRIEF DESCRIPTION OF THE DRAWINGS

The accompanying drawings, which are incorporated in and form part of the application, together with the description, serve to explain the principles of the invention.

DESCRIPTION OF THE PREFERRED EMBODIMENT

Figure 1:
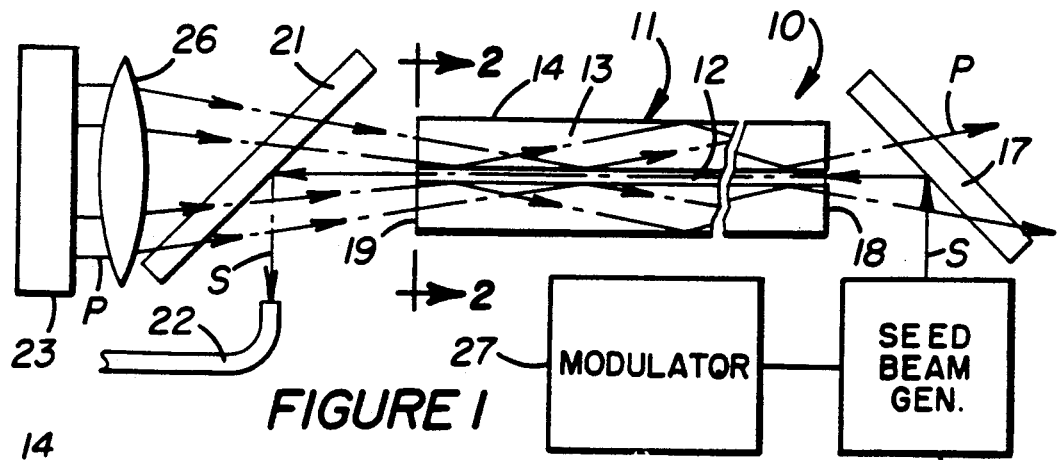
FIG. 1 is a generally schematic illustration of the system of the present invention.
Figure 2:
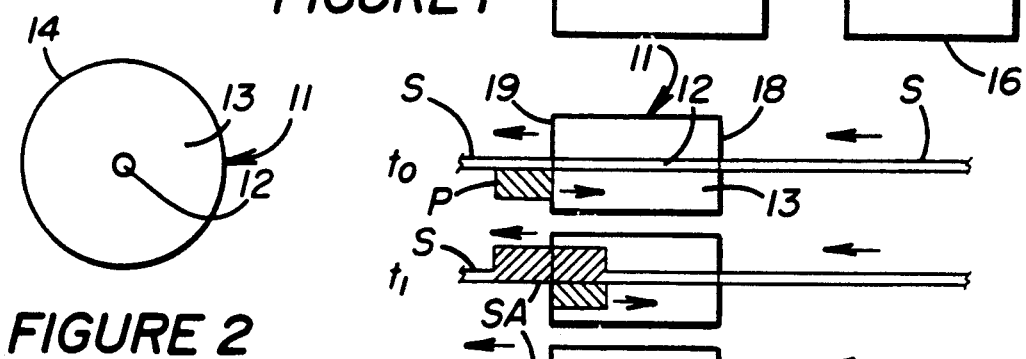
FIG. 2 is an end view of the optical fiber of FIG. 1, as seen from line 2-2 thereof.

Referring now to the drawings, and in particular to FIGS. 1 and 2, the apparatus 10 of the present invention includes an elongated optical amplifier fiber 11 having an inner core 12 and a transparent inner cladding 13 of a lesser index of refraction surrounding the core. This inner cladding 13 is then surrounded by an outer cladding 14 of a yet lower index of refraction. A seed beam generator 16 generates a light beam S that is reflected or transmitted by dichroic splitter 17 into the inner core 12 at end 18 of the amplifier fiber 11. Such seed beam will travel the length of the inner core 12 to the other end 19 of the amplifier fiber, and will be reflected by dichroic mirror 21 to a desired transmission medium, as for example into the end of an optical fiber 22. The length of the amplifier fiber 11 is chosen to produce an output pulse of the desired length, as more fully set forth below.

A pump laser 23 produces pump pulses P that are focused by an optical system represented by lens 26 through or from a dichroic splitter 21 into the cladding 13 of amplifier fiber 11 at end 19 thereof for travel through the length of the cladding of the optical pulse.

The inner core 12 of the amplifier 11 is a doped optical material that will provide an amplifying medium for light of the one color when driven into an excited state by light of a shorter wavelength. The fiber 11 may be an erbium-doped York DF1500 amplifier fiber, made by York Ventures and Optical Products, Ltd., Hampshire, England, or one similar thereto. Merely for purposes of illustration, the above York fiber has a core diameter of 2.8 microns and a cladding diameter of 125.8 microns. The laser 23 is selected, or tuned, so that its optical pulses P are of a shorter wavelength that produces excitation of the core 12 of the amplifier fiber 11, and the seed beam generator 14 produces a seed beam S of the longer wavelength that will be amplified in the excited core of fiber 11.

Figure 3:
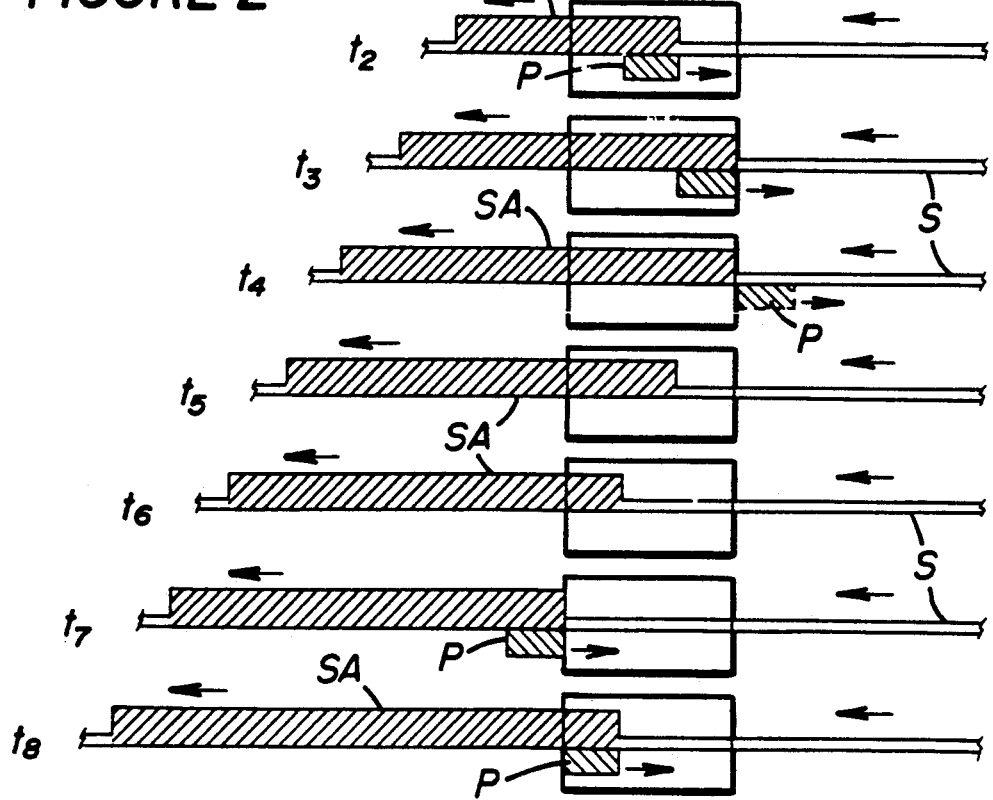
FIG. 3 is a chart illustrating the relationship between the length of the pump pulses, the length of the optical fiber and the length of the amplified output pulses.

Operation in accordance with the present invention is illustrated in FIG. 3. In this figure, the horizontal distance between adjacent vertical lines represents a time equal to the length of the pump pulses P. For purposes of illustration, the length of the amplifier fiber 11 is such that the transit time required for light of the wavelength of the pump pulses to travel the length of the fiber is three times the length of the pump pulses.

The seed beam S may be continuously introduced into the core 12 at end 18 of the fiber or may be a pulse of a duration that is longer than the desired output pulse. When, or after, the leading end of the seed beam S has reached the other end 19 of the fiber, i.e., at time $t_0$, the leading end of a pump pulse P is injected into the cladding 13 at the other end 19 of the fiber. As the pump pulse is injected into fiber 11, amplification of the seed beam S will begin immediately. At time $t_1$, the pump pulse P will be fully injected into the fiber 11, and an amplified portion of the seed beam S (represented by the cross-hatched portion SA of the seed beam) of a length equal to the length of the pump pulse P will have excited the end 19 of fiber 11.

As the pump pulse P proceeds through the cladding, i.e., to the portions shown at times $t_2$ and $t_3$, the zone of amplification in the core travels with it, amplifying the seed beam in the zone. As the pump pulse exits the end 18 of the fiber 11, the trailing portion of the pulse still within fiber 11 will continue to excite the seed beam S entering the fiber, until the pulse P completely leaves the fiber, i.e., at time $t_4$. At this time, the length of the amplified seed beam SA is equal to twice the transit time of pulse P through the fiber plus the length of the pulse P.

After the pump pulse has left the fiber, the portion of the amplified pulse SA within the fiber will continue to travel through the fiber until time $t_7$ when the entire amplified pulse SA has excited the fiber.

If there now is a time lapse until the next pump pulse, then the system will again proceed through the times $t_0$-$t_7$ described above with production of another stretched amplified output pulse.

At times, it may be desirable to use the pump pulses P to produce a continuous amplified output of the seed beams. For example, the seed beam S may have intelligence imposed thereon by modulator 27. As seen in FIG. 3, if the next pulse P2 is injected into the fiber 11, with the time between the end of the first pump pulse and the beginning of the next pump pulse (i.e., the time from $t_1$ to $t_7$) being approximately equal to twice the transit time of the pump pulse through the length of the cladding of the amplifier fiber, then the amplification of the seed beam S by the two pump pulses will be continuous. Similarly, repeated pump pulses will continuously amplify the seed beam without gaps in the intelligence from modulator 27.

As is apparent from the above, the length of the desired amplified output pulse will depend on the length of the fiber and the length of a pump pulse. For example, if a 50 nanosecond pump pulse from a copper vapor laser is used, and it is desired to obtain a 250 nanosecond output pulse, then the transit time of light of the wavelength of the pump pulse through the fiber will be equal to 100 nanoseconds. If the index of refraction of the fiber is about 1.5, the speed of the pump pulse through the fiber will be approximately 5 meters per nanosecond. As a consequence, the amplifier fiber should then be approximately 20 meters long to obtain the 250 nanosecond output pulse. Similarly, if a nitrogen laser with a 5 nanosecond pulse is used for pumping, a 205 nanosecond output pulse will be obtained from the above length of amplifier fiber.

With the pump pulses P being injected into and being confined within the cladding 13 as they travel the length of the fiber, the primary loss mechanism of the system is the absorption by the doped core 12 of the pump pulse energy, thus producing a system with high conversion efficiency of the output from laser 23. A selection of the cladding material to provide least loss in transit of the pulses through the cladding will optimize the performance of the system to reduce pump power losses. This may be achieved by surrounding the normal cladding layer with an additional cladding layer of a lower index to assure that the pump beam will be retained by total internal reflection. The dopant levels of the core 12 along its length can also be varied to compensate for the energy of the pump pulses lost to excitation of the core.

The foregoing description of the preferred embodiment has been presented for purposes of illustration and description. It is not intended to be exhaustive or to limit the invention to the precise forms described, and obviously many other modifications are possible in light of the above teaching. For example, a variety of gain mediums can be used for the core 12 of the amplifier fiber 11, ranging from doped glasses and dyed plastics to dyed fluids. Also, reflective optics can be used at either or both ends of the fiber for either the pump pulses and/or the seed beam to tailor the output intensity over time. The embodiments were chosen in order to explain most clearly the principles of the invention and its practical applications, thereby to enable others in the art to utilize most effectively the invention in various other embodiments and with various other modifications as may be suited to the particular use contemplated. It is intended that the scope of the invention be defined by the claims appended hereto.

It is claimed:

1. The method of producing a long amplified output pulse from a short pump pulse using an elongated amplifier fiber having an inner core of a material which provides an amplifying medium for light of one wavelength when driven into an excited state by light of a shorter wavelength and a cladding surrounding said inner core, the method comprising:
   injecting a seed beam of said one wavelength into said inner core at one end of said amplifier fiber, said seed beam having a time duration at least as long as said long amplified output pulse, injecting a pump pulse of said shorter wavelength into said cladding at the other end of said amplifier fiber, said pump pulse having a duration less than that of said long amplified output pulse, directing the amplified seed beam from the other end of said inner core to a desired transmission medium.

2. The method as set forth in claim 1, wherein initial injection of said pump pulse into said cladding is at a time following the initial injection of said seed beam into said inner core, said time being at least equal to the transit time of light of said one wavelength through the length of said fiber.

3. The method as set forth in claim 2, wherein said amplified output pulse has a desired length, and wherein said amplifier fiber has a length such that twice the transit time of light of said shorter wavelength through the length of said cladding plus the duration of said pump pulse equals said desired length of said amplified output pulse.

4. The method as set forth in claim 3, and further including injecting a second pump pulse of said shorter wavelength into said cladding at said other end of said amplifier fiber, with the time between the initial injections of said two pump pulses being at least as long as said desired length of said amplified output pulse.

5. The method of producing a continuous amplification of a seed beam using an elongated amplifier fiber having an inner core of a material which provides an amplifying medium for light of one wavelength when driven into an excited state by light of a shorter wavelength and a cladding surrounding said inner core, the method comprising:

continuously injecting a seed beam of said one wavelength into said inner core at one end of said amplifier fiber, repeatedly injecting pump pulses of said shorter wavelength into said cladding at the other end of said amplifier fiber, with the time between the end of one pump pulse and the beginning of the next pump pulse being no more than approximately twice the transit time of light of said shorter wavelength through the length of the cladding of said amplifier fiber, directing the amplified seed beam from the other end of said inner core to a desired transmission medium.

* * * * *